May 14, 1957 P. C. HEWETT 2,791,946
VARIABLE CONICAL CUTTER
Filed Oct. 31, 1952 2 Sheets-Sheet 2
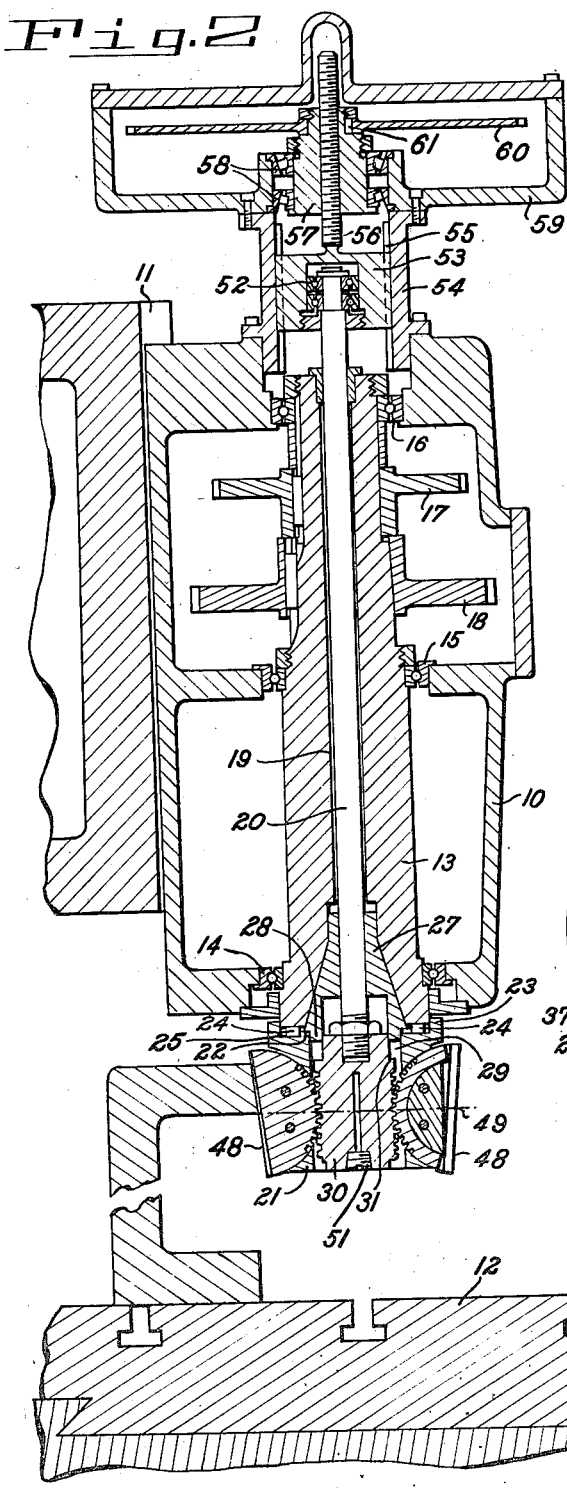
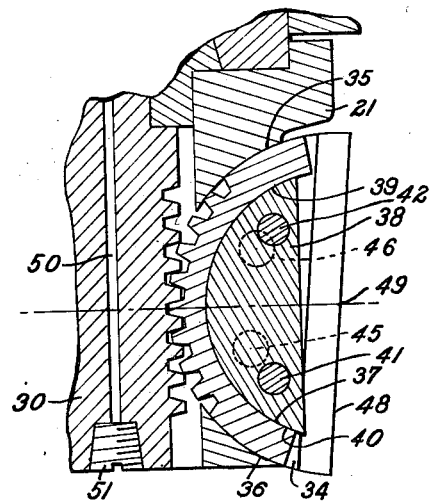
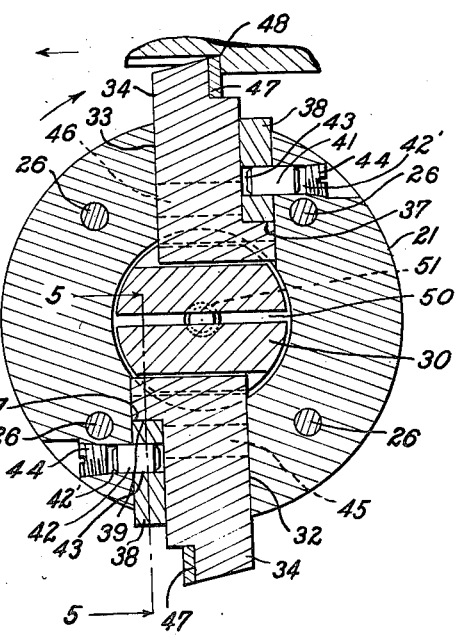
INVENTOR.
PHILIP C. HEWETT.
BY
N. K. Parsons & L. W. Wright.
ATTORNEYS.

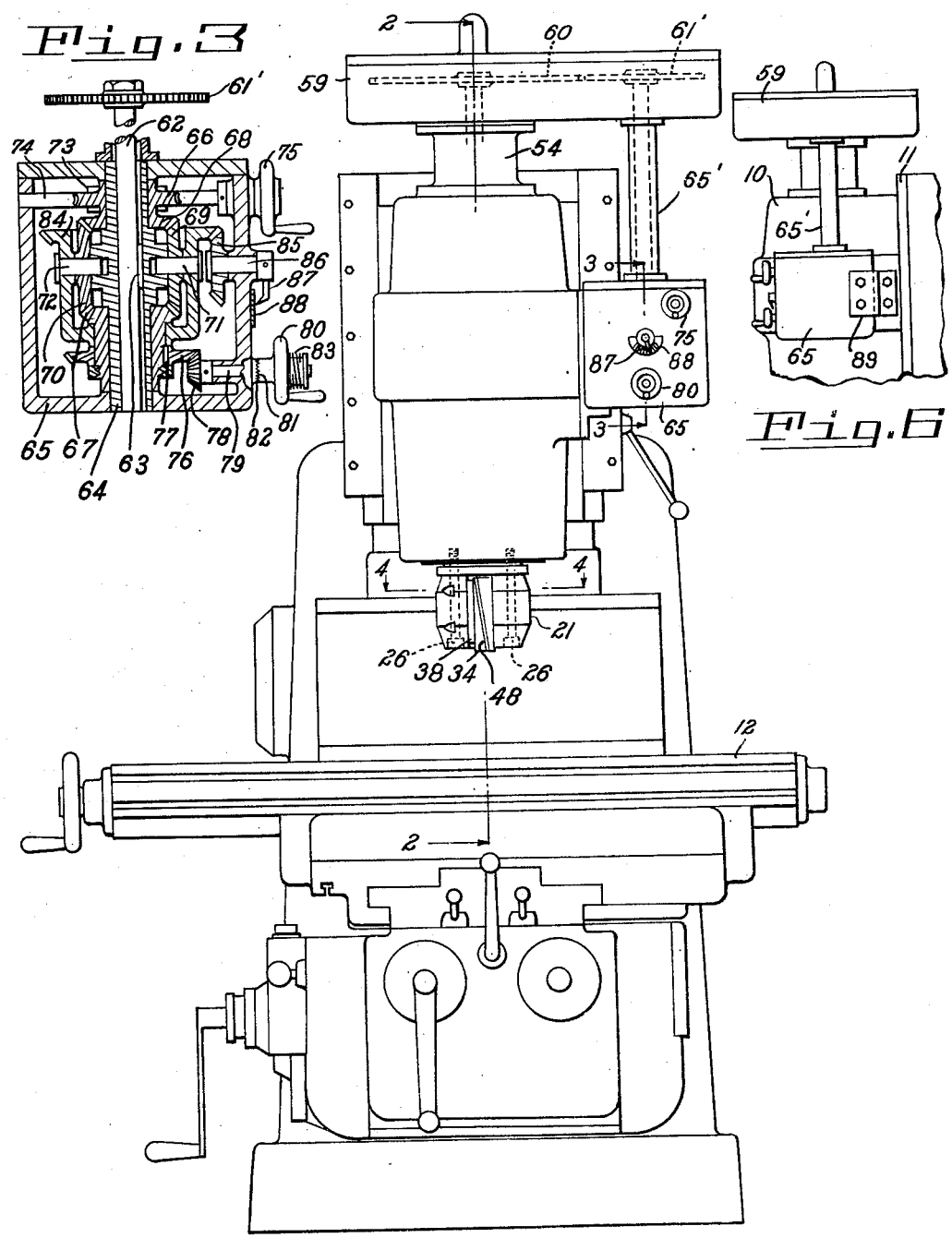
VARIABLE CONICAL CUTTER
Filed Oct. 31, 1952 — 2 Sheets-Sheet 1
INVENTOR.
PHILIP C HEWETT.
BY
ATTORNEYS.

United States Patent Office 2,791,946
Patented May 14, 1957

2,791,946

VARIABLE CONICAL CUTTER

Philip C. Hewett, Cincinnati, Ohio, assignor to The Cincinnati Milling Machine Co., Cincinnati, Ohio, a corporation of Ohio Application October 31, 1952, Serial No. 317,966

6 Claims. (Cl. 90—11)

This invention relates to cutter mechanisms and more particularly to a variable conical cutter mechanism, the angle of which may be continually varied with respect to the cutter axis during a machining operation to vary the angle of the conical or bevel surface being cut.

In setting up a milling machine to mill bevel or angular surfaces, such as on the edge of a work piece, it is usually necessary to either tilt the work or tilt the cutter axis in order to bring the parts into the necessary angular relationship. The conventional vertical spindle milling machine does not make provision for angular adjustment of the spindle axis with respect to the surface of the work support, and therefore it is necessary to either tilt the work or to use conical cutters of the particular angle desired. Such methods can be used where the angle of the work surface to be machined is constant.

A problem is now arising in the milling of angular surfaces which requires that the angle of the surface change during progress of the machining operation around the periphery of the work. A good example of this problem is in the milling of the sides of spars which form the framework of airplane wings. In such cases the bevel angle has to change to suit the streamline shape of the parts to be connected therewith. Such problems become further complicated because it is necessary to determine a reference plane from which the angle is to be measured and so that the outline or contour of the work in that plane will be accurately shaped to the outline of a desired pattern. This means that the apex of the angles of the elements that make up the side surface must lie in the line which forms the outline or shape of the work.

For instance, if the workpiece has parallel top and bottom surfaces, one of these surfaces is chosen as the reference plane in which the outline of the work is laid, and the apex of the angles of the side surfaces must lie in this line even though the angle of the side surface changes as the cutting progresses.

One of the objects of this invention is therefore to provide a cutter mechanism in which the angle of the cutting blade or blades may be varied with respect to the axis of rotation of the cutter body during rotation of the blades about said axis.

Another object of the present invention is to provide a mechanism of the class described which has a neutral plane, that is, a plane of constant diameter which may be superimposed upon the work plane containing the basic outline of the shape of the work and from which the angle of the adjustable cutters may be varied, without disturbing the constant diameter of the cutter in the neutral plane.

A further object of this invention is to provide a mechanism of the class described having separate means for effecting fast or slow adjustment of the cutting blades and thereby of the cutting angle.

Another object of the present invention is to provide an angularly adjustable cutter in which the cutting blades are positively held at all times during adjustment and in any position of angular adjustment.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine embodying the principles of this invention.

Figure 2 is a vertical section on the line 2—2 of Figure 1 showing the adjustable cutter mechanism.

Figure 3 is a section on the line 3—3 of Figure 1.

Figure 4 is a horizontal section on the line 4—4 of Figure 1.

Figure 5 is a detail section on the line 5—5 of Figure 4.

Figure 6 is an elevational view of gear housing as viewed from the right of Figure 1.

Referring to the drawings, Figure 1 shows a conventional vertical spindle milling machine in which this invention has been embodied. This machine has a vertical spindle carrier 10 which is mounted on guideways indicated generally by the reference numeral 11 by which it may be vertically guided for movement toward and from the horizontal surface on the work table 12. As shown in Figure 2, the rotatable spindle 13 is journaled in the carrier by means of bearings 14, 15, and 16. The spindle is rotated by conventional driving means through gears 17 and 18 which are keyed to the spindle. The spindle has an axial bore 19 for receiving a draw bar 20.

This invention includes a cutter head 21 having angularly adjustable blades and mechanism external of the cutter head for making the angular adjustment during rotation of the head. This cutter head has a counterbore in one end forming a flat surface 22 and a flange 23 which fits on the conventional spindle nose of the spindle 13. The spindle nose has a pair of keys 24 attached thereto and projecting therefrom into a cross slot or keyway 25 formed in the surface 22. The cutter body is secured in position on the end of the spindle nose for receiving rotation from the spindle by means of four bolts 26 shown in Figures 1 and 4, which are threaded in the end of the spindle. A tapered adapter 27 is mounted in the conventional tapered socket in the end of the spindle and is provided with a reduced portion 28 which fits into a central bore 29 formed in the cutter head 21. A circular rack member 30 is reciprocably mounted within the bore 29 and threadedly connected to the end of the draw bar 20. The member 30 has a shoulder 31 formed on one end for engaging the end of the adapter 27 and thereby limit the extent of axial movement of the rack member in one direction.

As shown in Figure 4, the cutter head 21 is provided with a pair of rectangular slots 32 and 33 for receiving the cutter blades 34, and these slots intersect the central bore 29 formed in the cutter head. The cutter blades 34 are semi-circular in shape and have gear teeth formed on their semi-circular periphery which intermesh with the circular rack teeth on the rack member 30. From this it will be seen that if the rack member 30 is moved axially it will cause rotation of the members 34. Although the cutter head is illustrated in Figure 4 as having only two cutter blades it will, of course, be understood that this number may be varied without departing from the principles of this invention.

It is, of course, necessary to hold the cutter blades in the slots, and provide a center of rotation, and attention is invited to the fact that the inner surfaces of the slots are so formed as to provide circular guide surfaces 35 and 36 as shown in Figure 5 whereby holding the members 34 against these surfaces will provide a guide for rotary movement and thereby determine the center of rotation. This is accomplished by providing each member 34 with a shoulder 37 against which bears a keeper 38 which also has a circular peripheral surface 39 which is concentric to the arc of the surfaces 35 and 36 and which bears against a conforming circular surface 40. Therefore, it may be said that the cutter members 34 have a circular flange formed thereon, the opposite faces of which are guided between the combined surfaces 35 and 36 on the one side and the circular face 39 of the keeper 38 on the other side and all of these surfaces have a common center.

The member 38 is held in the cutter body by means of a pair of pins 41 and 42 which, as shown in Figure 4, are driven into holes 42' formed in the cutter body and aligning holes 43 formed in the keeper. The holes 42' are enlarged and threaded at the open end to receive a threaded plug 44. It is not necessary that the pins 42 engage any of the parts at either end, and, in fact, it is preferable that a slight clearance at the ends be provided as shown in the drawings. For purposes of removing the blades 34, they are provided with a pair of holes 45 and 46 which may be aligned with the pin holes by rotation of the cutter blades, and by removing the plug 44 the pins may be driven into one of the holes whereby the blade and keeper may be removed together.

The cutter blades 34 are notched on the end to provide space for receiving cutting bits 47 which may be suitably secured to the cutter blades by conventional means, and each bit provides a cutting edge 48. Attention is invited to the fact that the common center of the radius of curvature of the guide surfaces 35, 36 and 39 lies in the cutting edge 48 and is indicated by the reference numeral 49 in Figure 5. By so doing, a circle passed through the points 49 about the cutter body represents a circle of constant diameter. Therefore, the plane of this circle constitutes a neutral plane, because the diameter of the circle will not change in spite of angular adjustment of the cutter blades. To insure against any backlash between the rack and gear teeth, the rack member 30 is split as shown by the slot 50 in Figure 4 and a tapered adjusting screw 51 is threaded in the end of the rack member as shown in Figure 2 whereby the rack member may be expanded to take out any backlash between the rack and gear teeth and insure that the cutter blades are positively held in any position of adjustment.

It will now be evident that by axially adjusting the rack member 30, that the angle of the blades with respect to the axis of rotation can be changed. The mechanism for effecting this adjustment, although external of the cutter head, is still to be considered part of it. To this end the draw bolt 20 is connected by an anti-friction thrust bearing 52 to a pistonlike member 53 slidably mounted in the tubular housing 54 attached to the top of the spindle carrier 10. Thus, the spindle carrier is simply means for supporting the housing in fixed spaced relation to the cutter head. The member 53 has a spline connection at 55 to the interior of the housing 54 to prevent rotation of the member 53. The member 53 has an integral screw 56 which is threaded in the nut member 57, that is, anti-frictionally journaled at 58 to an upper housing 59. The nut member 57 has a gear 60 keyed thereto at 61 whereby rotation of the nut member in one direction or the other will cause axial movement of the screw 56 and thereby through the member 53 and connected rod 20 can cause axial movement of the rack 30.

As shown in Figure 1, the gear 60 meshes with a second gear 61' journaled in the housing 59, and this gear is supported on the end of a shaft 62 which has a spline connection at 63 as shown in Figure 3 to the sleeve member 64 which is journaled in opposite ends of a housing 65 which is connected to the housing 59 by the tubular support 65' whereby the parts 54, 59, 65' and 65 form a unitary housing unit that may be applied to any suitable machine.

The sleeve 64 supports a worm gear 66 for free rotation thereon, at one end of the sleeve, while at the other end it supports a bevel gear 67 also mounted for free rotation. The worm gear 66 also has a bevel gear 68 formed integrally therewith and the bevel gears 67 and 68 intermesh with a pair of bevel gears 69 and 70 which are mounted for free rotation on supporting pins 71 and 72 respectively which are mounted radially in the sleeve 64. These gears form a differential gear arrangement.

The worm gear 66 intermeshes with a worm 73 mounted on supporting shaft 74 which extends exteriorly of the housing 65 and is provided with an operating hand wheel 75.

The lower bevel gear 67 has a second bevel gear 76 keyed thereto at 77 and intermeshing with a bevel pinion 78 supported by shaft 79. The shaft 79 carries the hand wheel 80 which is keyed to the shaft but which also has clutch teeth 81 adapted to intermesh with clutch teeth 82 formed integral with the housing 65. A spring 83 normally maintains the clutch teeth in engagement whereby the shaft 79, pinion 78, gear 76, and bevel gear 67 of the differential are held against rotation.

By holding the gear 67 against rotation, rotation of the hand wheel 75 will cause rotation of the bevel gear 68 and thereby precession of the gears 69 and 70 about the axis of the sleeve, thereby causing rotation of the sleeve and the shaft 62 splined therein. On the other hand, since the worm 73 and worm gear 66 form a natural positive locking mechanism, it becomes possible, by disengaging the hand wheel 80 from clutch teeth 82 to rotate the hand wheel 80 and cause rotation of the bevel gear 76 and thereby the gear 67 to cause precession of the gears 69 and 70 and rotation of the shaft 62. Since the ratio between the bevel pinion 78 and its intermeshing gear 76 is of a much lower ratio than the ratio of the worm and worm gear combination, the hand wheel 80 will affect fast adjustment of the rack member 30 while the hand wheel 75 will effect a relatively slow adjustment.

Another bevel gear 84 is supported for free rotation relative to the gear 67 but is connected to the pins 71 and 72 for movement therewith, and this gear intermeshes with a bevel pinion 85 fixed with the shaft 86 which is provided exteriorly of the housing with a pointer 87 for movement thereof with respect to a graduated scale 88. This scale is graduated to show the angle of the cutter blades. It is to be noted that the housing 65, as shown in Figures 1 and 6, is secured to the spindle carrier of the machine by angle iron 89 and therefore moves up and down with the spindle carrier when it is adjusted. It is also to be noted that since the draw bolt 20 has an anti-friction connection at 52 to the member 53 that it may rotate with the spindle without causing relative rotation between the threaded member 56 and the nut member 57. This makes it possible to effect angular adjustment of the blades by either the hand wheel 75 or 80 without interference with rotation of the spindle. It is also to be noted that since the screw 56 is positively held against axial movement with respect to the nut 57, that any radial thrusts on the cutter blades, which are uneven, will not disturb the angular adjustment of the blades.

There has thus been disclosed a variable conical cutter mechanism including a cutter body having angularly adjustable blades to vary the apex angle of the conical cutter and means for adjusting the angle of the blades while the cutter body is rotating, and even although the adjusting means is external of the cutter body, which of necessity it must be, the adjusting mechanism is still part of the cutter, and the cutter body and adjusting means form a device which can be manufactured as a unit and applied to any milling machine spindle of the type disclosed.

What is claimed is:

1. A milling cutter comprising a rotatable body having an axial bore and a plurality of radial slots formed in said body and intersecting said bore, the inner walls of said slots having a semi-circular shape forming guide surfaces, cutter blades mounted in said slots having cutting edges and corresponding semi-circular faces engaging said guide surfaces, keepers inserted in said slots having semi-circular faces engaging corresponding surfaces on the side of said blades for holding and guiding the blades in said slots for angular movement, the center of curvature of said semi-circular surfaces lying in said cutting edges means in said bore interengaging the semi-circular faces of said blades for imparting angular movement thereto, drive pins for locking the keepers in said slots, and holes in said blades for receiving said pins when driven out to release said keepers and remove the blades.

2. A variable conical cutter for a milling machine comprising a cutter body having a tapered shank adapted for mounting in one end of a hollow cutter spindle of the machine for receiving rotation therefrom, said body and shank having an axial bore, said body having a plurality of radial slots formed therein with semi-circular faces intersecting said bore, a semi-circular cutting blade mounted in each slot in engagement with the semi-circular face thereof, each blade also having a diametrical face on which is formed a cutting edge, means in said bore to effect angular adjustment of said blades about a center lying in said cutting edges during rotation of the body including a draw bar mounted in said bore having motion transmitting connections at one end to said blades and extending at the other end beyond said cutter spindle, a bracket adapted to be mounted on the machine in fixed space relation to said body and spindle and having a rotatable nut journaled therein, a slidable member guided in said bracket co-axial of said bar and having a threaded connection at one end with said nut and at the other end an anti-friction rotatable connection with said bar to permit rotation thereof with respect to said spindle and guide member, and means carried by said bracket for effecting rotation of said nut during rotation of said bar and cutter body to effect axial adjustment of said cutter blades during rotation thereof.

3. A variable conical cutter for a milling machine comprising a cutter body having a tapered shank adapted for mounting in one end of a hollow cutter spindle of the machine for receiving rotation therefrom, said body and shank having an axial bore, said body having a plurality of radial slots formed therein with semi-circular faces intersecting said bore, a semi-circular cutting blade mounted in each slot in engagement with the semi-circular face thereof, each blade also having a diametrical face on which is formed a cutting edge, means in said bore to effect angular adjustment of said blades about a center lying in said cutting edges during rotation of the body including a draw bar mounted in said bore having motion transmitting connections at one end to said blades and extending at the other end beyond said cutter spindle, a bracket adapted to be mounted on the machine in fixed space relation to said body and spindle and having a rotatable nut journaled therein, a slidable member guided in said bracket co-axial of said bar and having a threaded connection at one end with said nut and at the other end an anti-friction rotatable connection with said bar to permit rotation thereof with respect to said spindle and guide member, and means carried by said bracket for effecting rotation of said nut during rotation of said bar and cutter body to effect axial adjustment of said cutter blades during rotation thereof, said last-named means including a fast drive and a slow drive mechanism, manually operable means for relatively actuating the respective mechanisms, and means responsive to operation of either mechanism for indicating the angular setting of said blades.

4. A milling cutter comprising a rotatable body having an axial bore and a plurality of radial slots formed in said body and intersecting said bore, the inner walls of said slots having a semi-circular shape forming guide surfaces, cutter blades fitted in said slots and having semi-circular end faces engaging said inner walls, each blade having a cutting edge connecting opposite ends of said end faces in such relation that the center of curvature of each semi-circular face lies in said cutting edge, means forming auxiliary semi-circular guide faces on one side of said blades concentric with said end faces and of smaller radius, keepers inserted in said slots having semi-circular faces engaging said auxiliary faces for holding and guiding said blades in said slots for circular movement about the centers in the cutting edges, said end faces having teeth formed thereon, an actuator slidably mounted in said axial bore and having means engaging said teeth for imparting movement to said blades in accordance with axial movement of said actuator, a draw bar connected to said actuator, and means adapted to be held in fixed axially spaced relation ot said cutter body for imparting axial movement of said draw bar during power rotation of said cutter body.

5. A variable conical cutter for milling an elongated surface along the side of a workpiece at a variable angle comprising a cutter body having an axis of rotation, cutter blades radially inserted in said body and having cutting edges beyond the periphery of said body, means for guiding said blades in said body for angular movement of the cutting edges with respect to the axis of rotation of said body and about a center lying in said cutting edges whereby the centers of said cutting edges lie in a fixed circle tangent to one edge of said elongated surface, said body having an axial bore, means in said bore operatively connected to said cutters for imparting said angular movement, a draw bar lying on the axis of said cutter body and connected to said last-named means for imparting movement thereto, and means mounted in fixed spaced relation to said cutter for holding the draw bar against axial movement during rotation of the cutter body, said means including a screw and nut for imparting movement to the draw bar and relative to said body for adjusting said blades to vary the angle of cutting during rotation of the body.

6. In a milling tool for power rotation by a tool spindle axially fixed in a spindle housing, the combination of a rotatable body member having an axial bore, cutter blades radially mounted in said body and having cutting edges beyond the periphery of said body, means to guide each blade for rotary movement in a radial plane of the body passing through a center of rotation lying in the blade cutting edge, an actuator mounted in said axial bore and operatively connected to said blades for imparting rotation thereto, and means adapted to be mounted on the spindle housing in fixed spaced relation to said body member and operatively connected to said actuator for positively holding said blades in a predetermined angular position, said means being adjustable to change the angle of said cutting edges during rotation of the cutter by said spindle.

References Cited in the file of this patent
UNITED STATES PATENTS

| | | |
|---|---|---|
| 963,596 | Lescure | July 5, 1910 |
| 1,091,502 | Gearing | Mar. 31, 1914 |
| 1,442,804 | Hicks | Jan. 23, 1923 |
| 2,046,386 | Kettl | July 7, 1936 |
| 2,440,978 | Schlenkert | May 4, 1948 |
| 2,624,242 | Eberle et al. | Jan. 6, 1953 |

FOREIGN PATENTS

| | | |
|---|---|---|
| 266,442 | Switzerland | Jan. 31, 1950 |
| 416,353 | Germany | July 15, 1925 |